US 9,083,709 B2

(12) United States Patent
Moen et al.

(10) Patent No.: US 9,083,709 B2
(45) Date of Patent: Jul. 14, 2015

(54) VIRTUAL INTERNET PROTOCOL MIGRATION AND LOAD BALANCING

(75) Inventors: Daniel Gilbert Moen, Sunnyvale, CA (US); Venkataraman Natham, Fremont, CA (US); Devendra Mohan Badhani, San Jose, CA (US); Ali Golshan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 509 days.

(21) Appl. No.: 13/469,345

(22) Filed: May 11, 2012

(65) Prior Publication Data

US 2013/0301413 A1 Nov. 14, 2013

(51) Int. Cl.
*H04L 12/28* (2006.01)
*H04L 29/08* (2006.01)
*H04L 29/12* (2006.01)

(52) U.S. Cl.
CPC .......... *H04L 67/1002* (2013.01); *H04L 61/103* (2013.01)

(58) Field of Classification Search
USPC ......... 370/216, 219, 220, 230, 252, 249, 389, 370/392; 709/203, 208, 209, 223, 228, 238
See application file for complete search history.

(56) References Cited

U.S. PATENT DOCUMENTS

| | | | |
|---|---|---|---|
| 2004/0215752 A1* | 10/2004 | Satapati et al. | 709/223 |
| 2005/0025179 A1* | 2/2005 | McLaggan et al. | 370/468 |
| 2005/0132030 A1* | 6/2005 | Hopen et al. | 709/223 |
| 2008/0183854 A1* | 7/2008 | Hopen et al. | 709/223 |
| 2009/0016215 A1* | 1/2009 | Nadas et al. | 370/230 |
| 2009/0144444 A1* | 6/2009 | Chauffour et al. | 709/238 |
| 2011/0145420 A1* | 6/2011 | Kakadia | 709/228 |
| 2013/0159487 A1* | 6/2013 | Patel et al. | 709/223 |
| 2013/0174177 A1* | 7/2013 | Newton et al. | 718/105 |
| 2013/0185408 A1* | 7/2013 | Ngo | 709/223 |
| 2013/0227165 A1* | 8/2013 | Liu | 709/238 |
| 2013/0276070 A1* | 10/2013 | Lee | 726/4 |
| 2014/0032785 A1* | 1/2014 | Chaudhuri et al. | 709/245 |

\* cited by examiner

*Primary Examiner* — Kwang B Yao
*Assistant Examiner* — Nguyen Ngo
(74) *Attorney, Agent, or Firm* — Meunier Carlin & Curfman LLC (57) ABSTRACT

A system for virtual internet protocol (VIP) address migration. The system comprises serving one or more clients connected via a switch router over a network to one or more network gateways. The switch router forwards packets to the VIP address of a first network gateway. If the first network gateway determines a VIP address migration criteria has been reached, the first network gateway may migrate any new traffic associated with a packet flow over to a second network gateway for more efficient processing by inserting a default flow code into the header of the VIP address of the packet. Older packets continue to process on the first network gateway, however new packets are forwarded and processed on the second network gateway. Once the packets being processed on the first network gateway completes, the second network gateway becomes the default network gateway for processing existing and new packets.

16 Claims, 4 Drawing Sheets

VIRTUAL INTERNET PROTOCOL MIGRATION AND LOAD BALANCING

BACKGROUND

To enable sharing of data among computer users, most computer systems in use today are interconnected via a computer network. Computers in an office, for example, may be connected over a local area network (LAN) to gain access to a server computer, which manages common data storage. As used herein, a server refers to a computer that services and manages requests for data and other files from network computers utilizing wired and wireless communication networks. In the case of an Internet server, the computer network is the Internet. The Internet is a global computer network in which literally millions of user computers communicate with server computers over a widely distributed network.

The number of people using the Internet has been growing at a very fast rate, while the services provided over the Internet are increasingly becoming mission critical. One such mission critical service can be found in the growth of cloud computing services. Cloud computing provides computation, software, data access, and storage services that do not require end-user knowledge of the physical location and configuration of the system that delivers the services. Parallels to this concept can be drawn with the electricity grid, wherein end-users consume power without needing to understand the component devices or infrastructure required to provide the service.

Hence, enabling high performance, reliability, availability, and scalability as well as the creation of management tools, have become key issues in the development and maintenance of Internet servers that provide services such as cloud computing. The current approach for handling these issues from the server perspective is based on the concept of load balancing. The key to the load balancing approach is the ability to handle the various network requests with a system called a load balancer. A load balancer is a hardware device similar to a network router, a network gateway, a switch router or a server computer executing load balancing software that allows it to act as a primary network address dispatcher between various network resources.

Load balancing is not the only concern for network access in an Internet or cloud computing environment. Cloud resources could reside on-premise at a client site or off-premise at a service provider location. Cloud computing can take the form of public clouds, private clouds, inter-clouds, or Hybrid Clouds. In a cloud-computing environment, a client computer may be a mobile device accessing an application on a cloud server computer via a default network gateway during a road trip from New York, N.Y. to Washington, D.C. Between New York and Philadelphia, Pa. the default network gateway may be adequate as because it is geographically local to the mobile device. However, the further away the mobile device moves from New York City the server computers in New York may become less relevant to a user application that needs up-to-the-minute local information. For, example, the user application may require current traffic conditions for logistical purposes. If the mobile device is still connecting to a default gateway in New York as it passes through Philadelphia, the user's access to the most up-to-the-minute data may slowed by this connection. Furthermore, the application would have to be restarted if it was handed off to another more local gateway. Therefore, it would be desirable if in there were a method to dynamically migrate the client computer's connection from the distant default network gateway to a local default network gateway without losing the connection.

The default network gateways are also often a single point of failure in the case where there is no stand-by network gateway available. When there is a stand-by network gateway and a default network gateway failure occurs, the long reconfiguration time of the stand-by network gateway can severely affect the quality of service for network users. Finally, conventional load balancing systems do not typically maintain the network connection between client machines and servers during migration to a VIP address or in the event of a server failure. This can require client machines to repeat their requests for data, thereby reopening the network connection. All of these situations result in slowed responses or complete failures in response to network requests for Web pages, applications and other data.

SUMMARY

Exemplary implementations disclosed herein provide a scalable, distributed, highly available, load balancing server system having multiple network gateways for providing a method for load balancing and virtual internet protocol (VIP) address migration comprising a server hosting active applications and serving one or more clients connected via a switch router to a network via one or more network gateways, Server Load Balancers (SLBs) or Application Delivery Controllers (ADCs). The network gateways are connected to the one or more servers in an autonomous system having a common administration and common routing policies. The one or more servers have a VIP address and are coupled to the Internet via the one or more network gateways. A first and at least a second network gateway are configured to handle VIP traffic for routing. Packet traffic is sent from a client to a VIP address via the switch router to a network gateway for routing packet traffic from the client to the first network gateway. The first network gateway processes the packet traffic and routes the packet traffic to the VIP address of a server such that the first network gateway becomes the default gateway for routing packet traffic between the server and the client.

The first network gateway becomes the default gateway for routing packet traffic between the server and the client, the first network gateway determines if a load balance of the network has reached a predetermined threshold. This predetermined threshold indicates that the first network gateway is reaching its capacity limit, and thus would function more effectively if the traffic destined for one of the VIPs that is controls were instead handled by another, less loaded device, such as the second network gateway. The first network gateway inserts a default flow entry into the VIP address such that any new packet traffic to the VIP address is forwarded to the second network gateway. The first network gateway continues to process pre-existing packet traffic until the pre-existing packet traffic completes. Meanwhile, the second network gateway process new packet traffic in parallel to pre-existing packet traffic processing on the first network gateway. Once processing of the pre-existing packet traffic completes on the first network gateway, the second network gateway is converted to the default network gateway such that all future packet traffic is routed to the second network gateway.

The first and second network gateways described above may be a hardware or software appliance. The VIP address described above is a virtual Internet Protocol (VIP) address.

The second network gateway determines if the load balance of the network has reached a predetermined threshold, which when reached, the second network gateway inserts a default flow entry into the VIP address such that any new packet traffic to the VIP address is forwarded to an "N" network gateway. The second network gateway continues to process pre-existing packet traffic until the pre-existing packet traffic completes; and the "N" network gateway processes new packet traffic in parallel to pre-existing packet processing on the second network gateway. The "N" network gateway is converted to the default network gateway once the pre-existing packet traffic processing on the second network gateway completes, such that all future network traffic is routed to the "N" network gateway. When the load balance of the network at the second network gateway has fallen below a predetermined threshold, the "N" network gateway is the first network gateway. The first network gateway determines no pre-existing packet traffic exists with it and instructing the second network gateway to take ownership of the VIP address for packet routing. When the pre-existing packet traffic completes, the second network gateway is instructed to inform the switch router and the server that it owns the VIP address for packet routing.

Accordingly, exemplary implementations provide a scalable solution for cloud computing environments and a load balancing solution for server farms and also allow reliable network communications by providing a method of dynamic VIP address migration between two or more network gateways.

Furthermore, the described features, advantages, and characteristics of the disclosure may be combined in any suitable manner in one or more implementations. One skilled in the relevant art will recognize that the disclosure can be practiced without one or more of the specific features or advantages of a particular implementation. In other instances, additional features and advantages may be recognized in certain implementations that may not be present in all implementations of the disclosure.

Other features and advantages of the exemplary implementations should be apparent from the following description of the implementations, which illustrate, by way of example, the principles of the disclosure.

DETAILED DESCRIPTION

For purposes of promoting an understanding of the principle of the disclosure, reference will now be made to the exemplary implementations illustrated in the drawing(s), and specific language will be used to describe the same. It will never-the-less be understood that no limitation of the scope of the disclosure is thereby intended. Any alterations and further modification of the inventive features illustrated herein, and any additional application of the principles of the disclosure as illustrated herein, which would occur to one skilled in the relevant art and having a possession of this disclosure, are to be considered within the scope of the disclosure.

1. Dynamic VIP Address Migration Overview

Figure 1:
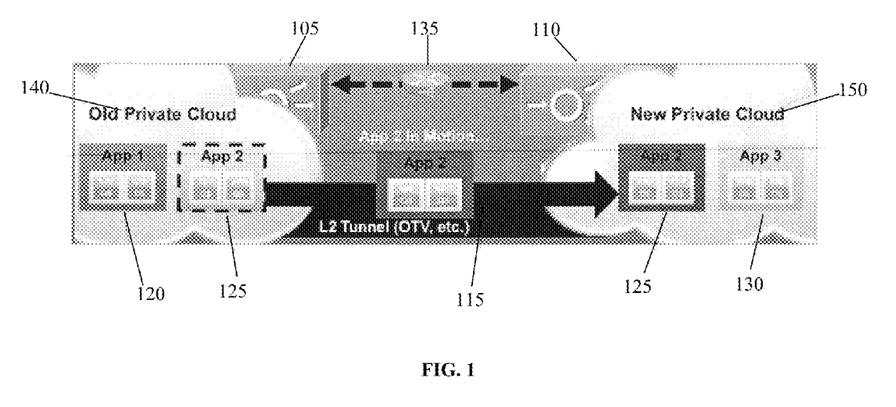
FIG. 1 is illustration depicting a live migration of an application between private clouds, according to exemplary implementations.

Referring now to the drawings more particularly by reference numbers, a simplified block diagram of an exemplary implementation of a dynamic VIP address migration between private cloud servers is shown in FIG. 1. For purposes of introduction, a VIP address refers to an Internet Protocol (IP) address, which is layer 3. Media Access Control (MAC) addresses are layer 2. An association between layer 2 and layer 3 addresses is used by networking devices to direct a packet to a destination host (identified by the IP address) by choosing the device attached to the local network that is one step closer to the actual destination, as these devices are identified by layer 2 MAC addresses. Generally, a packet is received by a router, which performs a lookup based on the IP address to find the next hop device for handling that IP address. The router will change the MAC address to that of the next hop device (leaving the IP address unchanged) and forward the packet to that next hop device. In the case of a migrating VIP address, a second SLB will claim "ownership" of the VIP address by advertising its own MAC address as being associated with the VIP address. Upstream routers will learn this new association and begin sending packets on to the second SLB.

A SLB or ADC device operates by translating a layer 3 VIP address to a server's IP address for packets originating from the client, and translating the Server's IP address back to the VIP address for packets originating from the server. A packet from a client destined to a VIP will arrive at the SLB which currently owns the VIP. At this time, the layer 3 source address is the client IP, and the destination address is the VIP. The SLB may select a server from its pool best able to handle the packet and will forward it to the server by changing the destination IP address from the VIP to the server's IP address. A similar operational flow is performed for the reverse case. An exemplary flow is as follows:

Client(CIP→VIP)=>(CIP→VIP)Router(CIP→
VIP)=>(CIP→VIP)SLB(CIP→SIP)=>
(CIP→SIP)Server FIG. 1 illustrates a system 100 of dynamic live migration between cloud servers 140 and 150. In this example cloud servers 140 and 150 may represent a cluster of server computers connected via network gateways 105 and 110 respectively, via networks 135 and 115. Due to loads on the network 135, maintenance, proximity, etc., efficiencies may be gained by moving an application from cloud server 140 to cloud server 150. In the implementation, App1 120 is actively processing on cloud server 140. At a later point in time, App2 125 is forwarded via network gateway 105 to cloud server 140 for processing. However, characteristics of the application may lend it to processing more efficiently on the new cloud server 150. Therefore, the network gateway 105 may forward the App2 125 to the new cloud server 150 for processing. In this example, the network gateway 105 modifies the MAC address of App2 125 so that App2 125 can be forwarded to new cloud server 150 via network gateway 110. App1 120 continues to process on cloud server 140 while App2 125 processes on cloud server 150. Therefore, all traffic for App1 120 is forwarded to cloud server 140, while all App2 125 traffic is forwarded from network gateway 105 to network gateway 110 via a connection 135 during this migration phase. During the migration phase, network gateway 105 is the default gateway for both App1 120 and App2 125. Thus, all traffic between the client, server and both App1 120 and App2 125 are directed through network gateway 105. However, once App1 120 processing completes, network gateway 110 becomes the default gateway for App2 125 processing and all future application processing, such as App3 130, are directed to network gateway 110 for processing on cloud server 150. This allows efficient processing of the applications at cloud server 150 which may have performance characteristics that are more line with the needs of App2 and App3, while freeing up the original cloud server 140 to handle processes that it already has active.

Figure 2:
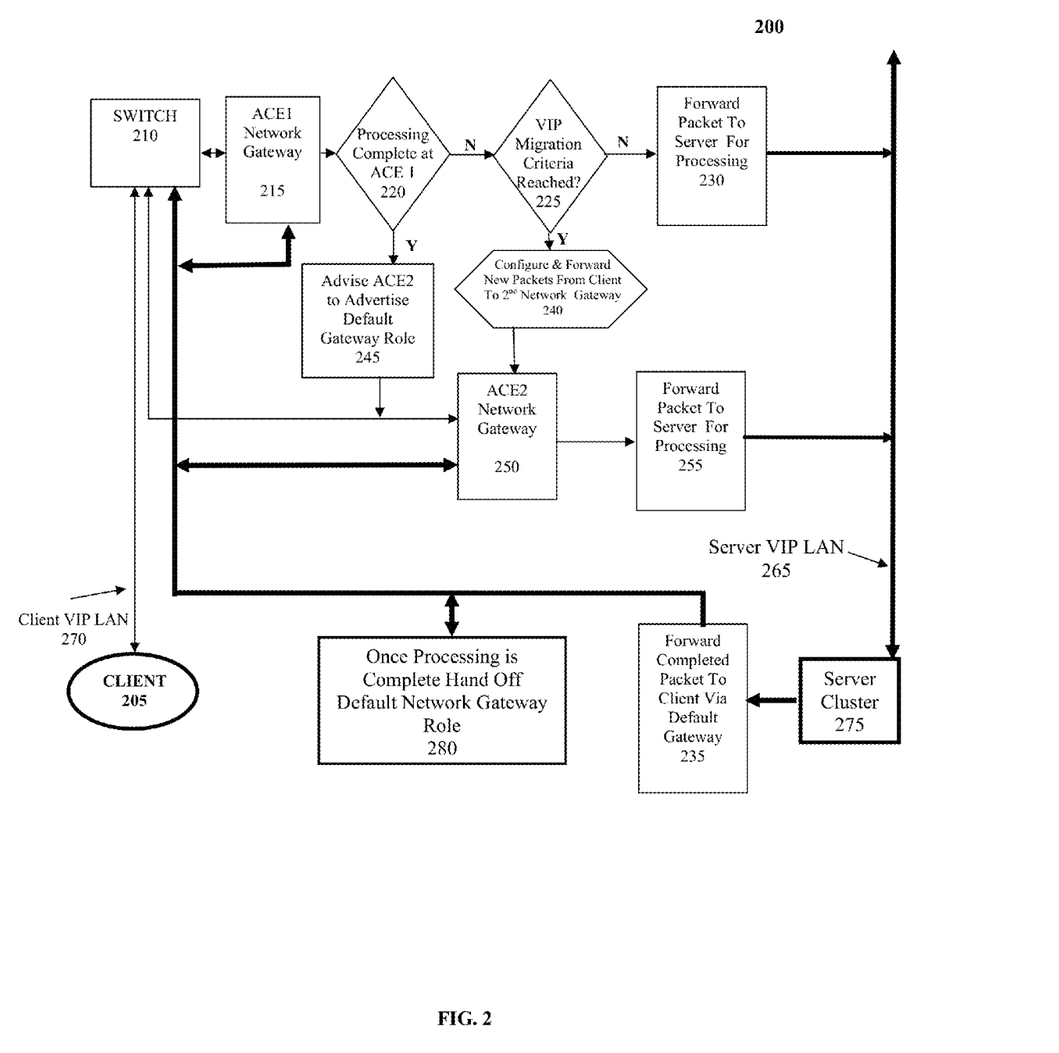
FIG. 2 is a flow chart illustrating a live migration process between cloud servers, according to exemplary implementations.

FIG. 2 is a flow chart illustrating the live VIP address migration between cloud servers as discussed above in FIG. 1. The system 200 illustrated in FIG. 2 shows cloud network gateways ACE1 215 and ACE2 250, each having VIP addresses. ACE1 and ACE2 may each be a CISCO Application Control Engine. The gateways ACE1 215 and ACE2 250 representing virtual cloud servers are connected to a Client 205 via a Switch 210 over a Client Virtual Internet Protocol (VIP) local area network (Client VIP LAN) 270. In an exemplary implementation, the VIP address of ACE1 215 is initially assigned as a default gateway. All client and server traffic is directed to this default VIP gateway address. The gateways ACE1 215 and ACE2 250 are also connected to one or more servers 250 over a Server LAN 265. The Server LAN 265 connects to the switch 210 and gateways ACE1 215 and ACE2 250 to allow the bi-directional flow of data packets between these components.

In an exemplary implementation, Client 205 sends data packets for processing over the Client VIP LAN 270 via switch 210. Switch 210 determines the default gateway for the data and forwards it accordingly. In an exemplary implementation, the VIP address of ACE1 215 is the default gateway address. Therefore, the data packets from Client 205 are initially forwarded to ACE1 215. ACE1 215 receives the packets determines if processing is complete for ACE1 at step 220. If the answer is no, ACE1 determines if a migration criteria has been reached at step 225. If the answer is no, then ACE1 can forward the packet to the server cluster 275 for processing in step 230. Server cluster 275 processes the data packet and then returns a response to the default gateway at step 235. ACE1 215 is still the default gateway; therefore, ACE1 215 receives the response and forwards it to switch 210 which in turn, forwards the response to the Client 205.

Due to load balancing issues, efficiency reasons, geographical requirements, etc., at some point it may be determined that ACE1 215 should not continue to handle all the data packet requests from Client 205. Therefore, when the Client 205 initiates a request, it is directed through switch 210 to the default gateway over the client VIP LAN 270, which is currently ACE1 215. ACE1 215 receives the request and forwards it over the server LAN 265 in step 230 to the appropriate server in the server cluster 275. The server cluster 275 receives and processes the request and forwards a response back to the Server LAN 265 to the default gateway in step 235, which is currently ACE1 245. ACE1 215 receives the response and forwards over the client VIP LAN 270 to the switch 210 and on to the client 205.

Meanwhile, if it is decided that the VIP should be migrated to, e.g., ACE2 250, when the Client 205 initiates a request, the request is directed over the client VIP LAN 270 to the switch 210 to the default gateway, which is currently ACE1 215. However, ACE1 215 determines that the request is now to be handled by ACE2 250 in step 225. Therefore, ACE1 215 modifies the MAC address header on the data packet at step 240 so that it is forwarded to ACE2 250 for processing. ACE2 250 receives the request and prepares it for forwarding in step 255. The packet is then forwarded over the Server LAN 265 to the appropriate server in server cluster 270. The server 270 processes the response and forwards it back over the Server LAN 265 to the default gateway at step 235, which is still currently ACE1 215. ACE1 215 receives the response and forwards to the switch 210 and on to the Client 205 over the client VIP LAN 270. Thus, packets associated with a connection which was established by ACE1 (215) are still handled by ACE1. Packets associated with an unseen connection will be forward to ACE2 (250) for processing. ACE2 will select a server and insert a connection for handling these flows. Future packets associated with an unseen connection will continue to be forwarded by ACE1 to ACE2 before undergoing a NAT translation and forwarded to the real server in the server pool (275).

At some point in the future, the existing flows to ACE1 215 time out in step 220. ACE1 215 then sends instructions to ACE2 250 to start advertising to the switch 210 and the server cluster 275 that it is now the default gateway in step 245. Therefore, the virtual MAC for VIP is moved from ACE1 215 to ACE2 250. ACE2 250 then becomes the default gateway. Thus, when a request is next initiated by the client 205 over the client VIP LAN 270, the switch 210 directs the request directly to ACE2 250. Again, ACE2 250 receives the request and prepares it for forwarding to the appropriate server 250 over the Server LAN 265 at step 255. The server 250 processes the response and forwards it back over the Server LAN 265 to the default gateway at step 235. The default gateway is now ACE2 250. Therefore, all future data packets requests are now migrated over to ACE2 250 as the new default gateway. It is clearly understood that any type of data requests could be processed and migrated using this system.

Figure 3:
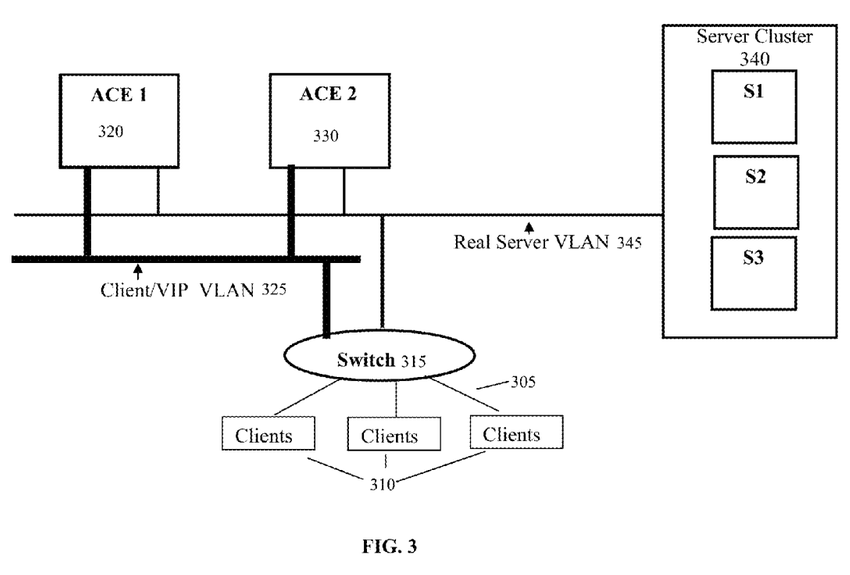
FIG. 3 is a schematic block diagram of a distributed server cluster, according to exemplary implementations.

FIG. 3 is a representation of a computer system 300 constructed in accordance with exemplary implementations. In the exemplary implementations system 300 includes a server cluster 340 connected via a virtual local area network (VLAN) between network gateways ACE1 320 and ACE2 330 and switch 315. As used herein, the ACE1 320 and ACE2 330 may be SLB devices. In an exemplary implementation, the server cluster 340 includes a plurality of computer servers S1, S2 and S3 for example, which are described in more detail in the discussion of FIG. 4 below. Further in exemplary implementations, switch 315 connects via the internet/network 305 to one or more client 310 machines. A separate Client VIP LAN attaches the switch 315 to the network gateways ACE1 320 and ACE2 330. The network gateways ACE1 320 and ACE2 330 along with switch 315 can dynamically reconfigure traffic assignments among themselves and provide increased network availability and improved server response to client machines over, for example, a network like the Internet. In an implementation, if the traffic at ACE1 330 becomes too heavy, the switch 315 can have traffic assignments moved among the remaining machines, such as ACE2 330, such that packet processing for a client 310 is substantially unchanged. In the illustrated implementation of FIG. 3, the external network 305 is the Internet, and therefore the data traffic being handled by the server cluster 340 follows the TCP/IP protocol model, but it should be understood that other network protocols may be accommodated by a distributed server cluster constructed in accordance with the disclosure, without departing from the teachings of the disclosure.

As described further below, network gateways ACE1 320 and ACE2 330 are connected to the distributed server cluster 340 via network 305 and communicate with each other such that dynamic traffic assignment reconfiguration occurs automatically in response to any machine being added or deleted from the server cluster 340, with no loss in functionality for the cluster. Therefore, the network gateways acting as primary network traffic dispatchers provide a system that is reconfigurable. The reconfiguration process is transparent to client users, thereby providing a distributed server functionality that is scalable. Each machine S1, S2, and S3 of the server cluster 340, with its own locally unique IP address, may implement an operational function to collectively provide a cluster function, such as web server, e-mail server, or encryption services, and can interface with subnet machines that provide data services or other file serving duties consistent with the cluster function. Each machine of the server cluster can continue with its operational functions while it participates in the distributed server cluster and dynamic reconfiguration processing. In this way, the disclosure substantially maintains network availability regardless of machine failures, so that there is no single point of failure and no lapse in server cluster functionality, because the use of multiple network gateways provide a more efficient alternative for VIP address migration and/or load balancing by bypassing the use of a single load balancer. In particular, because VIP addresses are owned by the SLB device(s) (i.e., ACE1 320 and ACE2 330), and the SLB devices present a single IP address to the switch (315), individual server outages will not impact the availability of the VIP address to the clients (310).

Each network gateway ACE1 320 and ACE2 330 of FIG. 3 is associated with an internet protocol (IP) address that uniquely identifies the machine and provides an address that is associated with a MAC address of a network interface card (NIC) of the respective machine. Those skilled in the art will understand that each of the physical machines includes a NIC interface for each network (internal and external) to which the machine is connected.

In accordance with exemplary implementations described in FIGS. 1-3, a VIP address is always presented on the client VLAN (325). A pool of addresses (i.e., a NAT pool) can be used and associated with a given ACE. The pool of address may be used as a replacement for the source IP address for packets sent to the real IP address. The NAT pool does not migrate with the VIP, but rather is used by the servers to determine where to send the response traffic. Software that provides the distributed VIP address migration functionality is installed in each of the network gateways ACE1 320 and ACE2 330 and switch 315. Thus, in FIG. 3, each of the network gateways may include a NIC interface, for connection of the respective machine two the internal subnets Clients/VIP LAN 325 and Real Server VLAN 345, and while each of the network gateways ACE1 320 and ACE2 330 and server cluster machines are associated with a primary IP address and with a virtual IP address for the Real Server VLAN 345 subnet.

Because of the distributed server cluster software installed at each network gateway ACE1 320 and ACE 2 330, clients 310 and switches 315, the server cluster 340 will know of and may direct data packets to an address in that NAT pool, rather than the primary IP address associated with each network gateway ACE1 320 and ACE 2 330.

As described more fully below, the dynamic assignment of VIP addresses to primary IP addresses permits reconfiguration in response to machine problems and in response to variations in network traffic loading among the machines. If a server cluster machine (e.g., ACE1 320 or ACE2 330) becomes unavailable, then the VIP address (or addresses) for which it was responsible is simply assigned to one or more different server cluster machines or one or more network gateways. This capability is referred to as a fail-over capability. A related feature is the scalability of the system, such that the system automatically reconfigures itself dynamically as more capacity is needed or as applications are moved from one cloud server to the next. This also permits more efficient workload distribution among the server cluster machines. If a server cluster machine becomes heavily burdened with data traffic, one or more of the VIP addresses assigned to it will instead be assigned to one or more different server cluster machines.

3. Computer Construction

Figure 4:
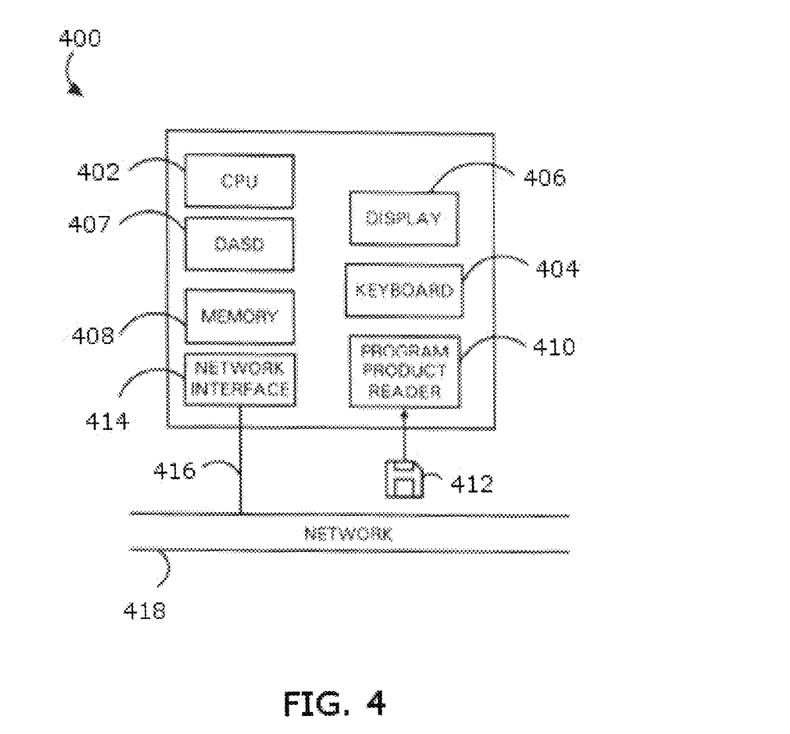
FIG. 4 is a block diagram of a client or server computer system of FIG. 3, illustrating the hardware components of the computer, according to exemplary implementations.

FIG. 4 is a block diagram illustrating the hardware components of client computers 305, network gateway servers ACE1 320 and ACE2 330, and server cluster 340 computers S1, S2, S3 in the server system of implementations described herein. Those skilled in the art will appreciate that the client computers 305, network gateway servers ACE1 320 and ACE2 330, and server cluster 340 computers S1, S2, S3 in the server system can all have a similar computer construction.

Each computer 400 operates under control of a central processor unit (CPU) 402, such as a microprocessor. A computer user can input commands and data from a keyboard 404 and can view inputs and computer output at a display 406. The display 406 is typically a video monitor or flat panel display. The computer 400 also includes a direct access storage device (DASD) 407, such as a hard disk drive. The memory 408 typically comprises volatile semiconductor random access memory (RAM). Each computer preferably includes a program product reader 410 that accepts a program product storage device 412, from which the program product reader 410 can read data (and to which it can optionally write data). The program product reader 410 can comprise, for example, a disk drive, and the program product storage device 412 can comprise a network connection, removable storage media such as a magnetic floppy disk, a CD-R disc, a CD-RW disc, or DVD disc. Each computer 400 can communicate with the others over the network through a network interface 414 that enables communication over a connection 416 between the network 418 and the computer. The network interface 414 typically comprises, for example, a Network Interface Card (NIC) that permits communications over a variety of networks. In the server cluster 340 (FIG. 3), the network can comprise an Ethernet network or can comprise a connection to the Internet.

The CPU 402 operates under control of programming steps that are temporarily stored in the memory 408 of the computer 400. When the programming steps are executed, the Distributed Server cluster 340 machine performs its functions. Thus, the programming steps implement the functionality of the distributed system architecture modules 410. The programming steps can be received from the DASD 407, through the program product storage device 412, or through the network connection 416. The storage drive 410 can receive a program product 412, read programming steps recorded thereon, and transfer the programming steps into the memory 408 for execution by the CPU 402. As noted above, the program product storage device 412 can comprise any one of multiple removable media having recorded computer-readable instructions, including magnetic floppy disks and CD-ROM storage discs. Other suitable program product storage devices 412 can include magnetic tape and semiconductor memory chips. In this way, the processing steps necessary for operation in accordance with the disclosure can be embodied on a program product.

Alternatively, the program steps can be received into the operating memory 408 over the network 418. In the network method, the computer receives data including program steps into the memory 408 through the network interface 414 after network communication has been established over the network connection 416 by well-known methods that will be understood by those skilled in the art without further explanation. The program steps are then executed by the CPU 402 to implement the processing of the Distributed Server Cluster system 340.

It should be understood that client computers 305, network gateway servers ACE1 320 and ACE2 330, and server cluster 340 computers S1, S2, S3 in the server system of FIG. 3 of the computer system illustrated in FIG. 3 have a construction similar to that shown in FIG. 4, so that details described with respect to the computer 400 will be understood to systems illustrated, for example, in FIG. 1-FIG. 3. Alternatively, any of the server cluster 340 computers S1, S2, & S3 may have an alternative construction, so long as they can communicate with the other computers and support the functionality described herein.

Thus, while the present disclosure has been fully described above with particularity and detail in connection with what is presently deemed to be the most practical implementation of the disclosure, it will be apparent to those of ordinary skill in the art that numerous modifications, including but not limited to, variations in size, materials, shape, form, and function and manner of operation, assembly and use may be made without departing from the principles and concepts of the disclosure as set forth in the claims. Further, it is contemplated that implementations may be limited to consist of, or to consist essentially of one or more of the features, functions, structures, methods, described herein.

What is claimed is:

1. A method for virtual internet protocol (VIP) migration comprising:
    hosting active applications and serving one or more clients connected via a switch router over a network to one or more network gateways, the network gateways having a VIP address, connected to one or more servers, each server having its own locally unique IP address and being coupled to a network via the one or more network gateways;
    providing a first network gateway with a VIP address and configured to handle packet traffic for routing;
    providing a second network gateway with a VIP address and configured to handle packet traffic for routing;
    forwarding packet traffic from a client via the switch router to a VIP address of a network gateway, wherein the first network gateway processes the packet traffic and routes the packet traffic to the VIP address of a server such that the VIP address of first network gateway becomes a default VIP address for routing packet traffic between the server and the client;
    determining a VIP address migration criteria has been reached and the first network gateway inserting a default flow entry into the VIP address such that new packet traffic to the default VIP address is forwarded to the second network gateway, wherein the first network gateway continues processing pre-existing packet traffic until processing of the pre-existing packet traffic is complete, and wherein the second network gateway processes new packet traffic in parallel to the pre-existing packet traffic processing on the first network gateway; and
    assuming ownership of the VIP address by the second network gateway by advertising ownership using a gratuitous ARP (IPv4) or Neighbor Advertisement (IPv6) broadcast
    wherein if the first network gateway determines no pre-existing packet traffic exists with it, the second network gateway is instructed to take ownership of the VIP address for packet routing.

2. The method according to claim 1, wherein the first and second network gateway is a hardware or software appliance.

3. The method according to claim 2, wherein a Media Access Control (MAC) address is used to direct a packet between the first and second network gateway.

4. The method according to claim 1, wherein the second network gateway determines a VIP address migration criteria has been reached, and the second network gateway inserts a default flow entry into the VIP address such that any new packet traffic to the VIP address is forwarded to a "N" network gateway, wherein the second network gateway continues to process pre-existing packet traffic until the pre-existing packet traffic completes, the "N" network gateway processes new packet traffic in parallel to pre-existing packet processing on the second network gateway, the method further comprising:
    converting the VIP address of the "N" network gateway to a default VIP address once the pre-existing packet traffic processing on the second network gateway completes, such that all future network traffic is routed to the VIP address of the "N" network gateway.

5. The method according to claim 4, wherein when a load balance of the network at the second network gateway has fallen below a predetermined threshold, the "N" network gateway is the first network gateway.

6. A method for virtual internet protocol (VIP) migration comprising:
    hosting active applications and serving one or more clients connected via a switch router over a network to one or more network gateways, the network gateways having a VIP address, connected to one or more servers, each server having its own locally unique IP address and being coupled to a network via the one or more network gateways;
    providing a first network gateway with a VIP address and configured to handle packet traffic for routing;
    providing a second network gateway with a VIP address and configured to handle packet traffic for routing;
    forwarding packet traffic from a client via the switch router to a VIP address of a network gateway, wherein the first network gateway processes the packet traffic and routes the packet traffic to the VIP address of a server such that the VIP address of first network gateway becomes a default VIP address for routing packet traffic between the server and the client;
    determining a VIP address migration criteria has been reached and the first network gateway inserting a default flow entry into the VIP address such that new packet traffic to the default VIP address is forwarded to the second network gateway, wherein the first network gateway continues processing pre-existing packet traffic until processing of the pre-existing packet traffic is complete, and wherein the second network gateway processes new packet traffic in parallel to the pre-existing packet traffic processing on the first network gateway; and
    assuming ownership of the VIP address by the second network gateway by advertising ownership using a gratuitous ARP (IPv4) or Neighbor Advertisement (IPv6) broadcast,
    wherein when the pre-existing packet traffic to the first network gateway completes, the second network gateway is instructed to inform the switch router and the server that it owns the VIP address for packet routing.

7. An apparatus for virtual internet protocol (VIP) migration comprising:
    a plurality of servers for hosting active applications and serving one or more clients connected via a switch router to a network and one or more network gateways, the network gateways connected to one or more servers, the one or more servers coupled to a network via the one or more network gateways;

a first network gateway having a VIP address and configured to handle packet traffic for routing, the first network gateway determining a VIP address migration criteria of the network and inserting a default flow entry into the VIP address such that any new packet traffic to a default VIP address is forwarded to the VIP address of a second network gateway; and a second network gateway having a VIP address and configured to handle packet traffic for routing, wherein the switch router forwards packet traffic from a client to the first network gateway, wherein the first network gateway processes the packet traffic and routes the packet traffic to the VIP address of a server such that the VIP address of the first network gateway becomes the default VIP address for routing packet traffic between the server and the client, wherein the first network gateway continues processing pre-existing packet traffic until processing of the pre-existing packet traffic is complete and the second network gateway processes new packet traffic in parallel to the pre-existing packet traffic processing on the first network gateway, and wherein the second network gateway becomes the default network gateway such that all future packet traffic is routed to the VIP address of the second network gateway, wherein the first network gateway determines if no pre-existing packet traffic exists with it, and instructs the second network gateway to take ownership of the VIP address for packet routing.

8. The apparatus according to claim 7, wherein the first and second network gateway is a hardware or software appliance.

9. The apparatus according to claim 8, wherein a Media Access Control (MAC) address is used to direct a packet between the first and second network gateway.

10. The apparatus according to claim 7, wherein the second network gateway determines if the VIP address migration criteria of the network, and the second network gateway inserts a default flow entry into the VIP address such that any new packet traffic to the VIP address is forwarded to a "N" network gateway, wherein the second network gateway continues to process pre-existing packet traffic until the pre-existing packet traffic completes, and the "N" network gateway processes new packet traffic in parallel to pre-existing packet processing on the second network gateway, and wherein the VIP address of the "N" network gateway is converted to the default VIP address of the network gateway once the pre-existing packet traffic processing on the second network gateway completes, such that all future network traffic is routed to the VIP address of the "N" network gateway.

11. The apparatus according to claim 10, wherein when a load balance of the network at the second network gateway has fallen below a predetermined threshold, the "N" network gateway is the first network gateway.

12. An apparatus for virtual internet protocol (VIP) migration comprising:

a plurality of servers for hosting active applications and serving one or more clients connected via a switch router to a network and one or more network gateways, the network gateways connected to one or more servers, the one or more servers coupled to a network via the one or more network gateways;

a first network gateway having a VIP address and configured to handle packet traffic for routing, the first network gateway determining a VIP address migration criteria of the network and inserting a default flow entry into the VIP address such that any new packet traffic to a default VIP address is forwarded to the VIP address of a second network gateway; and a second network gateway having a VIP address and configured to handle packet traffic for routing, wherein the switch router forwards packet traffic from a client to the first network gateway, wherein the first network gateway processes the packet traffic and routes the packet traffic to the VIP address of a server such that the VIP address of the first network gateway becomes the default VIP address for routing packet traffic between the server and the client, wherein the first network gateway continues processing pre-existing packet traffic until processing of the pre-existing packet traffic is complete and the second network gateway processes new packet traffic in parallel to the pre-existing packet traffic processing on the first network gateway, wherein the second network gateway becomes the default network gateway such that all future packet traffic is routed to the VIP address of the second network gateway, and wherein when the pre-existing packet traffic to the first network gateway completes, the second network gateway is instructed to inform the switch router and the server that it owns the VIP address for packet routing.

13. A system for load balancing comprising:

an application control engine that hosts active applications and serves one or more clients connected to a switch router over a network via one or more network gateways, the network gateways connected to one or more servers, the one or more servers having a VIP address and coupled to the Internet via the one or more network gateways;

a first network gateway configured to handle packet traffic for routing; and a second network gateway configured to handle packet traffic for routing, wherein the switch router forwards packet traffic from a client to a VIP address of the first network gateway, wherein the first network gateway processes the packet traffic and routes the packet traffic to an IP address of a server such that the VIP address of the first network gateway becomes a default VIP address for routing packet traffic between the server and the client, wherein if a load balance of the network at the first network gateway has reached a predetermined threshold, a default flow entry is inserted into the VIP address at the first network gateway such that any new packet traffic to the VIP address is forwarded to the VIP address of the second network gateway, wherein the first network gateway continues processing pre-existing packet traffic until processing of the pre-existing packet traffic is complete, and the second network gateway processes new packet traffic in parallel to the pre-existing packet traffic processing on the first network gateway, and wherein the second network gateway assumes ownership of the VIP address by advertising ownership using a gratuitous ARP (IPv4) or Neighbor Advertisement (IPv6) broadcast once the pre-existing packet traffic processing on the first network gateway completes, such that all future packet traffic is routed to the VIP address of the second network gateway wherein the second network gateway determines if the load balance of the network has reached a redetermined threshold, which when reached, the second network gateway modifies the address within a packet header with a default flow entry such that any new packet traffic to the VIP address is forwarded to a "N" network gateway, wherein the second network gateway continues to process pre-existing packet traffic until the pre-existing packet traffic completes, and the "N" network gateway processes new packet traffic in parallel to pre-existing packet processing on the second network gateway, wherein all future network traffic is routed to the VIP address of the "N" network gateway, and wherein when the load balance of the network at the second network gateway has fallen below a predetermined threshold, the "N" network gateway is the first gateway.

14. The system according to claim 13, wherein the first and second network gateway comprises a hardware or software appliance.

15. The system according to claim 14, wherein a Media Access Control (MAC) address is used to direct a packet between the first and second network gateway.

16. A system for load balancing comprising:
an application control engine that hosts active applications and serves one or more clients connected to a switch router over a network via one or more network gateways, the network gateways connected to one or more servers, the one or more servers having a VIP address and coupled to the Internet via the one or more network gateways;
a first network gateway configured to handle packet traffic for routing; and
a second network gateway configured to handle packet traffic for routing, wherein the switch router forwards packet traffic from a client to a VIP address of the first network gateway, wherein the first network gateway processes the packet traffic and routes the packet traffic to an IP address of a server such that the VIP address of the first network gateway becomes a default VIP address for routing packet traffic between the server and the client, wherein if a load balance of the network at the first network gateway has reached a predetermined threshold, a default flow entry is inserted into the VIP address at the first network gateway such that any new packet traffic to the VIP address is forwarded to the VIP address of the second network gateway, wherein the first network gateway continues processing pre-existing packet traffic until processing of the pre-existing packet traffic is complete, and the second network gateway processes new packet traffic in parallel to the pre-existing packet traffic processing on the first network gateway, wherein the second network gateway assumes ownership of the VIP address by advertising ownership using a gratuitous ARP (IPv4) or Neighbor Advertisement (IPv6) broadcast once the pre-existing packet traffic processing on the first network gateway completes, such that all future packet traffic is routed to the VIP address of the second network gateway, and wherein the first network gateway determines if no pre-existing packet traffic exists with it, and instructs the second network gateway to take ownership of the VIP address for packet routing, and wherein when the pre-existing packet traffic to the first network gateway completes, the second network gateway is instructed to inform the switch router and the server that it owns the VIP address for packet routing.

* * * * *